United States Patent [19]
Brown

[11] Patent Number: 5,553,762
[45] Date of Patent: Sep. 10, 1996

[54] VEHICLE CARRIER AND RAMP ASSEMBLY

[76] Inventor: Charles Brown, 3016 Joanna Dr., Farmers Branch, Tex. 75234

[21] Appl. No.: 311,326

[22] Filed: Sep. 23, 1994

Related U.S. Application Data

[63] Continuation-in-part of Ser. No. 220,206, Mar. 30, 1994, abandoned.

[51] Int. Cl.$^6$ ................................................. B60R 9/042
[52] U.S. Cl. .................. 224/403; 224/405; 224/558; 224/310; 296/3; 414/462; 414/537; 414/538
[58] Field of Search ....................... 224/309, 310, 224/311, 280, 281, 282, 42.07, 42.42, 42.45 R, 402, 405; 414/537, 538, 548, 462; 296/3, 81, 82, 37.7, 43; 280/32, 656; 108/56.3, 55.1; 52/126.1

[56] References Cited

U.S. PATENT DOCUMENTS

| | | |
|---|---|---|
| 3,613,920 | 10/1971 | Flamm . |
| 3,734,321 | 5/1973 | Long et al. ............... 414/462 |
| 3,757,972 | 9/1973 | Martin . |
| 3,977,545 | 8/1976 | Lloyd . |
| 3,989,148 | 11/1976 | Donohue . |
| 4,274,788 | 6/1981 | Sutton ..................... 414/462 |
| 4,444,427 | 4/1984 | Martin ...................... 296/3 |
| 4,527,827 | 7/1985 | Maniscalco et al. ........... 224/311 |
| 4,874,284 | 10/1989 | New, Jr. . |
| 4,960,356 | 10/1990 | Wrenn ..................... 414/462 |
| 5,009,457 | 4/1991 | Hall ........................ 296/3 |
| 5,069,595 | 12/1991 | Smith et al. ............... 414/462 |
| 5,108,141 | 4/1992 | Anderson ................ 224/42.45 R |
| 5,152,570 | 10/1992 | Hood ....................... 296/3 |
| 5,287,579 | 2/1994 | Estevez, Jr. ................ 414/537 |
| 5,393,191 | 2/1995 | Alexander ................. 414/537 |
| 5,447,408 | 9/1995 | Smith ...................... 414/537 |

Primary Examiner—Henry J. Recla
Assistant Examiner—Gregory M. Vidovich
Attorney, Agent, or Firm—Stephen R. Greiner

[57] ABSTRACT

A vehicle carrier and ramp assembly includes two, spaced-apart platforms maintained at an elevated position above the top edges of the side walls of a pickup truck body so as to preserve significant cargo space upon the truck bed. The platforms are supported at each of their respective ends by braces carried by the pickup truck side walls. Two elongated and collapsible ramps may be selectively engaged with the rear end of the platforms for loading and unloading a small land vehicle such as an ATV. A hinge, joining the ramp segments or spans together, has a stop feature for maintaining the spans at an obtuse angle relative to one another while extended during loading and unloading operations. When the pickup truck is moved from place to place, the ramps may be folded and secured above the side walls of the truck and above the elevated platforms, offering a peripheral and protective barrier to an ATV or other carried vehicle.

6 Claims, 7 Drawing Sheets

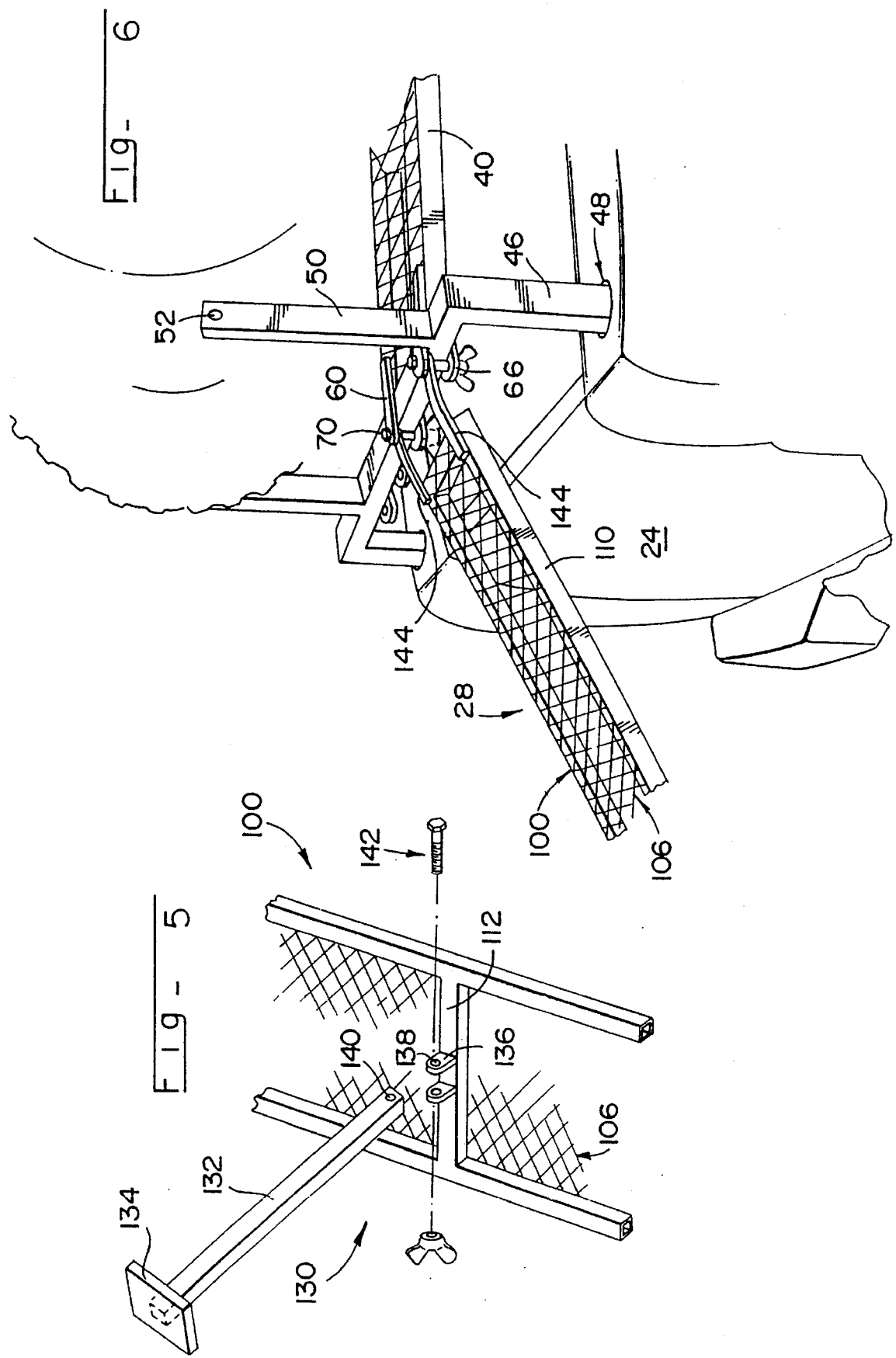

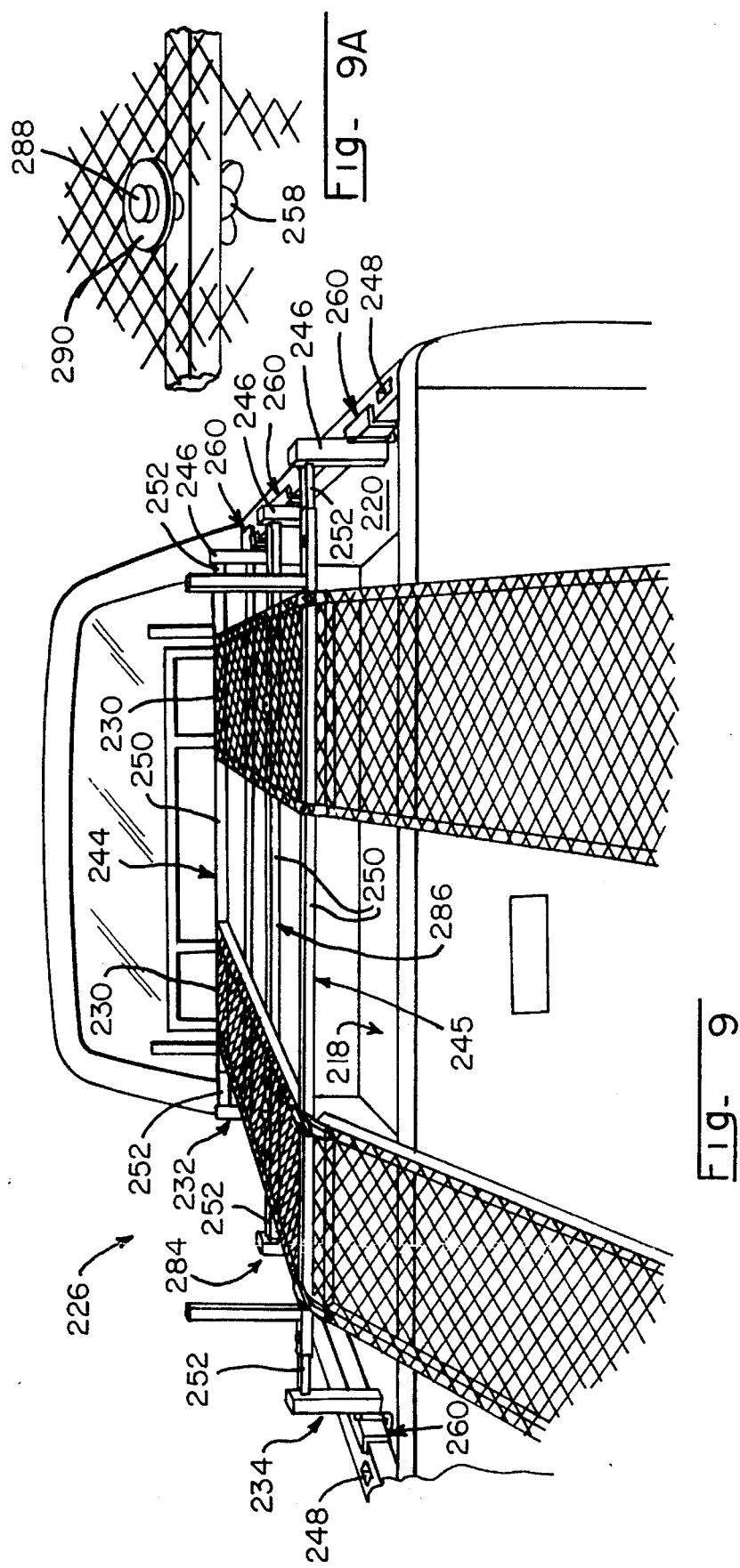

VEHICLE CARRIER AND RAMP ASSEMBLY

This application is a continuation-in-part of the application, Ser. No. 08/220,206, filed Mar. 30, 1994, now abandoned.

FIELD OF THE INVENTION

The present invention relates generally to land vehicle bodies and, particularly, to racks and ramps used for loading and storing articles thereon.

BACKGROUND OF THE INVENTION

It has become increasingly common to utilize pickup trucks for transporting all terrain vehicles (ATVs) to remote sites for off-road riding. Special platforms with detachable ramps have been developed to alleviate some of the well known problems associated with the handling of the relatively heavy and bulky ATVs. Although most of these platform structures provide an elevated supporting surface above the bed of the pickup truck so as to avoid the inwardly projecting wheel wells of the truck, none utilize the space beneath the supporting surface to its fullest advantage. Frequently, this limited, load carrying space is wasted as a repository for the platform loading ramps when being moved from place to place. Thus, cargo, other than the loaded ATV, cannot be easily carried by the pickup truck.

Space limitations beneath the platform's supporting surface require that the loading ramps be provided with a relatively short overall length so as to ensure a proper fit upon the pickup truck bed. Use of these short ramps has, however, proven to be somewhat of a hazard with ATV upset on their steeply sloping surfaces being an ever present problem. Furthermore, because of the low ground clearance of most ATVs, it is often impossible to negotiate the angled junction between the ramp and the horizontal supporting surface of the platform during loading or unloading operations without "bottoming-out." A need, therefore, exists for a combined vehicle carrier and ramp assembly having ramps with a length appreciably greater than a pickup truck bed for safely loading an ATV as well as having means for usefully storing the ramps in such a fashion so as to maximize the cargo carrying space in the bed of the pickup truck.

SUMMARY OF THE INVENTION

In view of the above-mentioned problems, it is a principal object of the present invention to provide a vehicle carrier and ramp assembly adapted for readily loading and transporting an ATV, or other wheeled vehicle, onto a pickup truck and for simultaneously maximizing the cargo space on, or about, the truck bed for carrying additional items.

It is another object of the invention to provide a vehicle carrier and ramp assembly with a vehicle supporting surface which is suspended above a pickup truck bed and maintained at an elevated position above the top edges of the pickup truck side walls by a plurality of braces adapted for engagement with the side walls of the pickup truck.

It is a further object of the instant invention to provide a vehicle carrier and ramp assembly having a pair of lightweight and laterally positioned platforms defining a vehicle supporting surface above the bed of the truck.

Still another object of the invention is to provide a vehicle carrier and ramp assembly with a pair of hinged ramps which may be selectively alternated between an extended loading configuration and a collapsed configuration for transport and storage about the sides and rear of the vehicle supporting surface so as to form a peripheral barrier to the movement of a carried vehicle such as an ATV.

It is another object of the invention to provide a vehicle carrier and ramp assembly with means for retaining the two conjoined spans comprising each hinged ramp at an obtuse angle relative to one another when most fully extended so as to limit the lateral extension or "footprint" of the ramp during loading and unloading operations in confined areas.

It is an additional object of the present invention to provide a vehicle carrier and ramp assembly with auxiliary supports, detachably connected to the upper spans of each ramp, extending downwardly to the ground surface for additional ramp stability while loading a vehicle onto and from the vehicle supporting surface.

It is an object of the invention to provide improved elements and arrangements thereof in a vehicle carrier and ramp assembly for the purposes described which is lightweight, inexpensive, dependable and fully effective in accomplishing its intended purposes.

These and other objects of the present invention will become readily apparent upon further review of the following specification and accompanying drawings.

BRIEF DESCRIPTION OF THE DRAWINGS

The present invention may be more readily described with reference to the accompanying drawings, in which:

FIG. 5 is a bottom perspective view of a second portion of a ramp illustrating the attachment means for the auxiliary support.

FIG. 6 is a partial perspective view of a portion of the vehicle carrier and ramp assembly showing the means for connecting the ramps to the carrier portion.

FIG. 9 is a perspective view of a modified form of the vehicle carrier and ramp assembly utilizing the bracket.

FIG. 9A is a perspective view showing details of the connection between the prop and one platform.

Similar reference characters denote corresponding features consistently throughout the accompanying drawings.

DETAILED DESCRIPTION OF THE PREFERRED EMBODIMENTS

Figure 1:
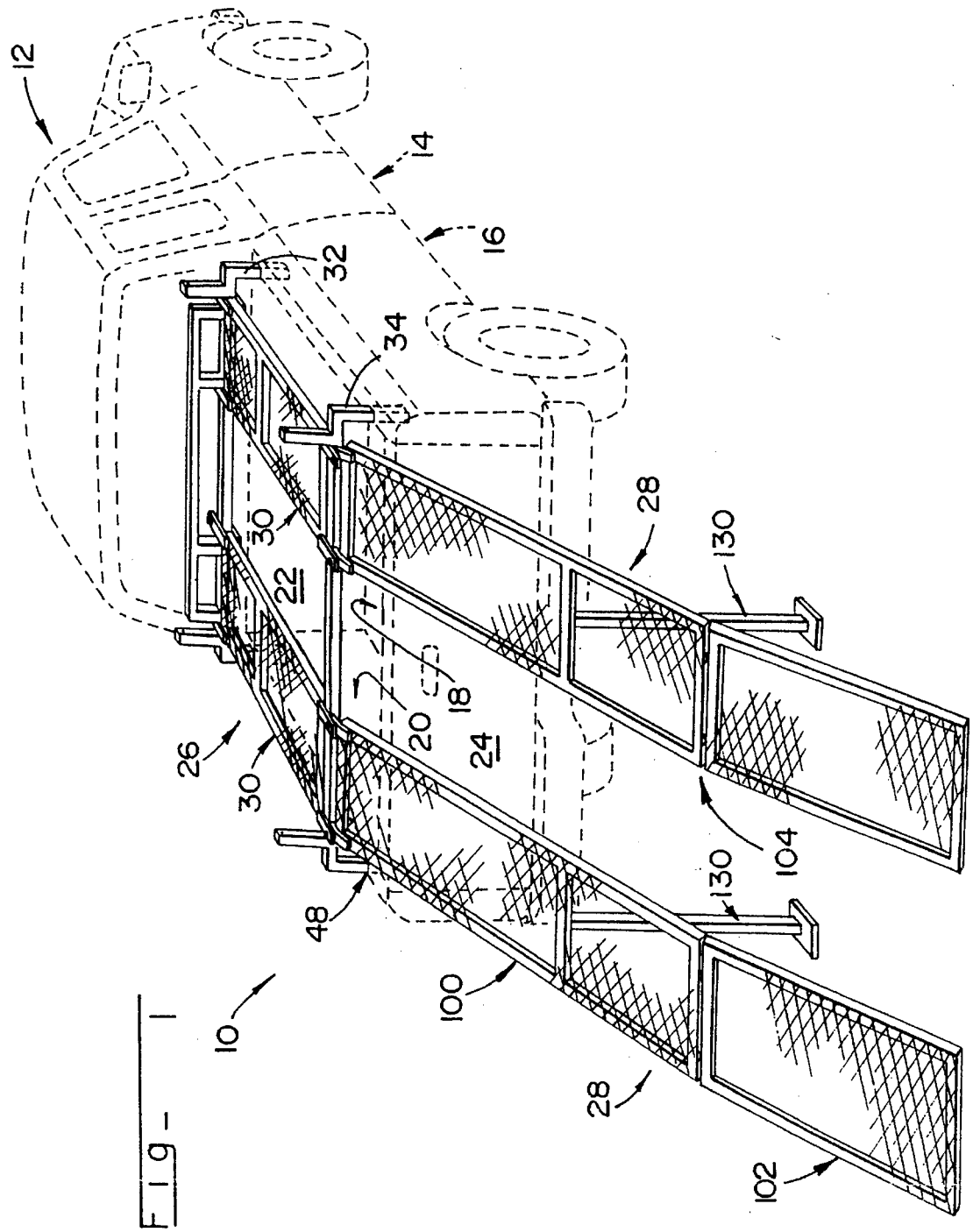
FIG. 1 is a perspective view of a vehicle carrier and ramp assembly in accordance with the present invention installed for use upon a pickup truck, the ramps extended for loading.

Referring now to FIG. 1, a vehicle carrier and ramp assembly 10 in accordance with the present invention is shown installed upon a pickup truck 12 and ready for the loading of an ATV thereon. The pickup truck 12 includes a passenger compartment or cab 14 and a body 16 positioned behind the cab. The body 16 has a rectangular bed 18 at the bottom thereof, laterally spaced side walls 20 extending upwardly from the bed, and longitudinally spaced front and rear end walls 22 and 24 connecting the side walls 20 and extending upwardly from the bed. The body 16 has an open top, allowing access to the bed 18, and supports the carrier portion 26 of the present invention. Two collapsible ramps 28, for facilitating the loading and unloading of an ATV, detachably connect the carrier portion 26 with the ground surface.

Figure 3:
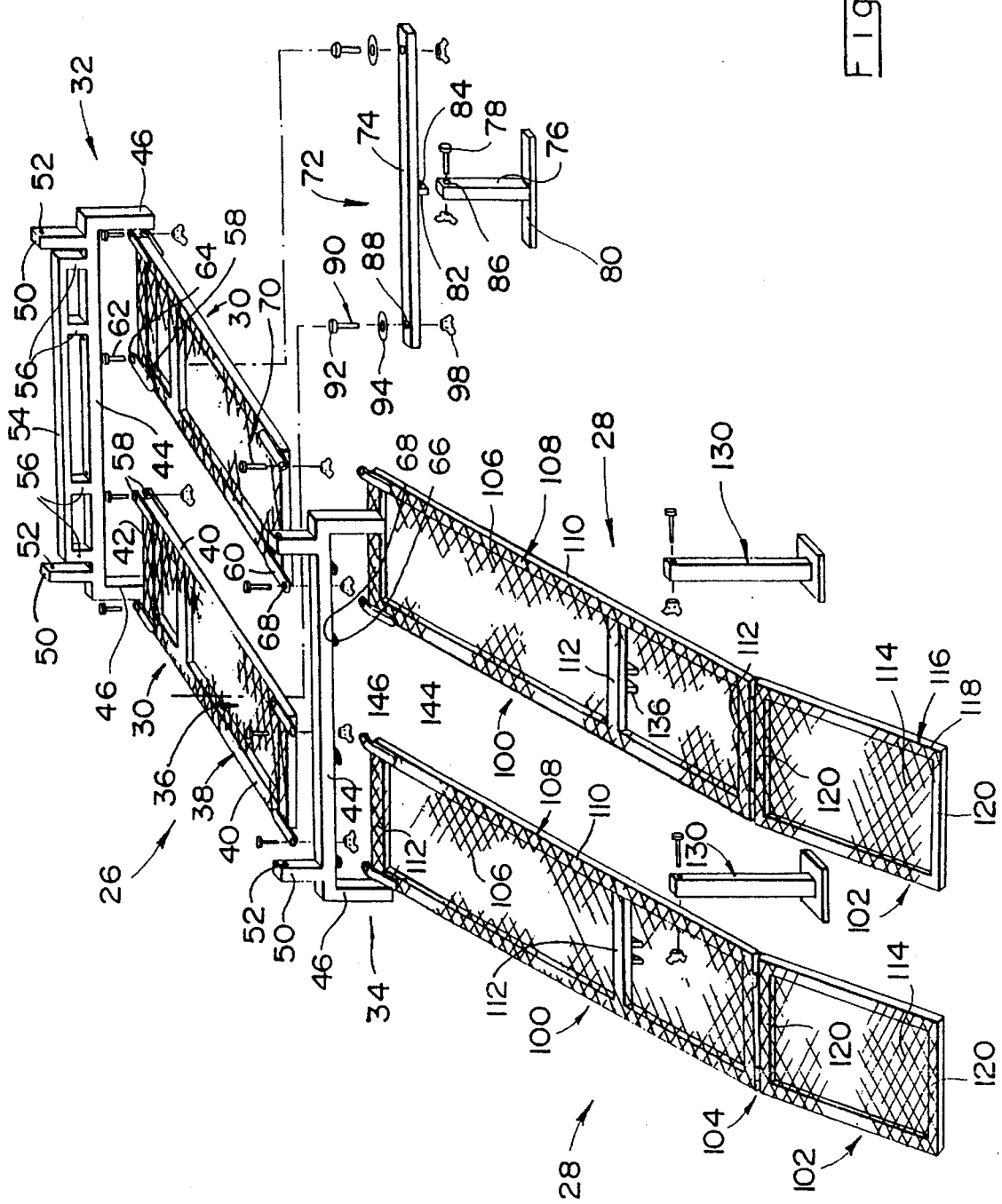
FIG. 3 is an exploded perspective view illustrating the component parts of the vehicle carrier and ramp assembly.

The carrier portion 26 includes two, laterally spaced platforms 30 defining a vehicle supporting surface maintained in a spaced relation above the bed 18 by forward and rearward braces 32 and 34. As shown in FIG. 3, each platform 30 is rectangular in shape and includes a rigid surface sheet 36 welded to the top of a supporting frame 38 fabricated from square metal tubing. Preferably, the surface sheet 36 will be of an expanded metal mesh, as illustrated. However, other materials, such as metal or wood sheeting, may be readily substituted for the expanded metal mesh. The frame 38, itself, comprises a pair of laterally positioned side rails 40 joined by a series of relatively shorter transverse rails 42. When the rails 40 and 42 are welded together, the transverse rails 42 define a pair of end rails having an intermediate rail parallel thereto and positioned therebetween. As each of the side rails 40 and transverse rails 42 is positioned beneath the sheet 36, the platform 30 is provided with a flat, yet reinforced, top surface.

The forward and rearward braces 32 and 34 bridge the distance between the opposing truck side walls 20. Both of the braces 32 and 34 include a horizontal beam 44 supported at each of its ends by a vertical shaft or column 46 adapted to be partially inserted into one of the stake pockets 48 provided in the side walls 20 of the pickup truck 12 proximate each corner of the bed 18. Like the platform frames 38, the braces 32 and 34 are fabricated from square metal tubing which is well known for its light weight and great strength under load. Preferably, the metallic columns 46 and beams 44 are secured together by welds so as to form an integral unit having a configuration somewhat resembling an inverted "U" in shape. Since the columns 46 preferably have a length equivalent to about twice the depth of the stake pockets 48, this inverted U-shaped configuration, wherein the beams 44 are held at a fixed distance above the side walls 20, is readily apparent to an observer when the carrier portion 26 is installed upon pickup truck 12 for use.

Figure 2:
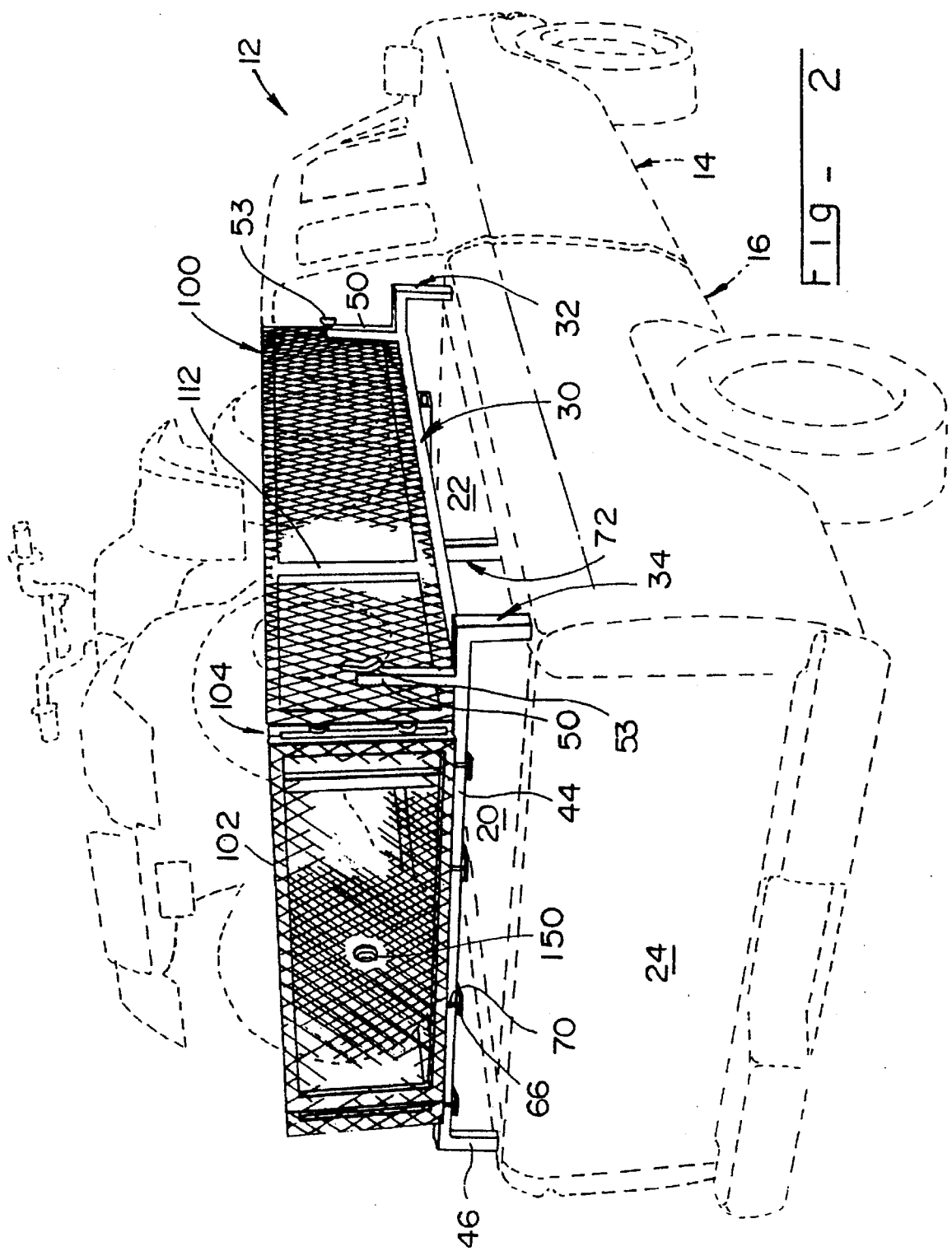
FIG. 2 is a perspective view of the vehicle carrier and ramp assembly of FIG. 1, the ramps in position for transporting a loaded ATV.

Extending vertically upward from each horizontal beam 44 is a pair of stays 50 for supporting the ramps 28 during their transport from place to place as is illustrated in FIG. 2. The stays 50 comprise similar lengths of square metal tubing, each having a height approximately equivalent to one-half of the width of a single ramp 28. Each stay 50 is welded to the top of a beam 44 and is spaced from its counterpart on a given beam at a distance sufficient to accommodate a single ATV. Proximate the top of each stay 50, a lateral bore 52 passes through opposing walls of the square metal tubing and provides a means for retaining a threaded fastener 53 (see FIG. 2) adapted for securing one of the ramps 28 thereto in a manner which will be described more fully hereinbelow.

The forward brace 32 is provided with a front rail or safety barrier 54 to prevent the inadvertent movement of an ATV into the pickup truck cab 14. The safety barrier 54 is formed from a length of square metal tubing welded at each of its ends, and at intermediate spaced locations, to a series of short, vertical struts 56 which give support thereto. The struts 56, themselves, are welded to the top of the beam 44 between the stays 50 in two, laterally-positioned pairs which aid in preventing the side-to-side movement of the forward end of each platform 30 as will become apparent.

Flanges 58 and 60 projecting from the platforms 30 provide the platforms with means for attachment to, and quick release from, the forward and rearward braces 32 and 34. Extending from the leading edge of each platform 30 are four flanges 58 of like construction. One of the flanges 58 extends horizontally forward from the upper surface of each side rail 40 while another extends horizontally forward from the lower surface of each side rail. The flanges 58 are vertically spaced from one another on opposing sides of rails 40 so that the beam 44 of the forward brace 32 will fit snugly therebetween. Further, the flanges 58 of a given platform 30 are laterally spaced from one another so as to enclose a corresponding pair of struts 56 in close-fitting fashion. Bolts 62 extend through the openings 64 provided in the ends of the flanges 58, which project beyond, i.e., overhang the beam 44, to selectively secure the platforms 30 to the forward brace 32. Similarly, extending from the rearward edge of each platform 30 are two flanges 60. The flanges 60 extend horizontally rearward from the upper surface of each side rail 40 and overhang the beam 44 of the rearward brace 34 when the platform 30 is utilized for carrying purposes.

Dual pairs of flanges 66 permit the platforms 30 to be positively secured to the brace 34 in a spaced-apart and parallel relationship. The flanges 66 are welded to the bottom of the beam 44 of brace 34 and extend rearwardly so as to receive vertically disposed fasteners or bolts 70 extending through the flanges 60 when properly positioned above. Cooperating openings 68 provided in the free ends of the flanges 60 and 66 permit the passage of the bolts 70 for securing the platforms 30 to the rearward brace 34. Tertiary flanges (not shown), integrally joined to the flanges 66 and projecting from beam 44 in an opposite sense, i.e., horizontally forward, may be employed to support the rearward end of each platform 30 and further strengthen the connection between the platforms 30 and brace 34.

When extremely heavy loads are to be disposed upon the carrier portion 26, a T-shaped prop 72 may be utilized to support or steady the platforms 30. As shown in FIG. 3, the prop 72 essentially comprises two lengths of square metal tubing: a horizontal beam 74 and a vertical supporting column 76, selectively joined together by a threaded fastener 78. The beam 74 is preferably sized to simultaneously engage all of the platform side rails 40 when positioned midway between the platform ends during use. The column 76, on the other hand, has a plate or foot 80 welded to its base for positioning upon the truck bed 18 and has an overall length sufficient to hold the beam 74 firmly against the platform frames 38 when vertically oriented with the foot 80 engaged with the bed 18.

Means are provided to selectively secure the prop components together and retain the prop 72 in a vertical, load-bearing orientation beneath the platforms 30 during use. A projection 82 welded to the beam 74 at the midpoint between its two ends may be fully inserted into the top of the hollow column 76. The projection 82 and the column 76 are both provided with laterally opposed bores 84 and 86 through which a threaded fastener 78 may be inserted to secure the beam 74 to the supporting column 76. The two ends of the beam 74, on the other hand, have vertical bores 88 through their upper and lower surfaces through which threaded fasteners 90 may be inserted. The fasteners 90 are of such a length that the heads 92 thereof may be held by washers 94 atop the expanded metal sheet 36 while their threaded portions 96, extending through the beam 74, are secured with wing nuts 98.

Figure 7:
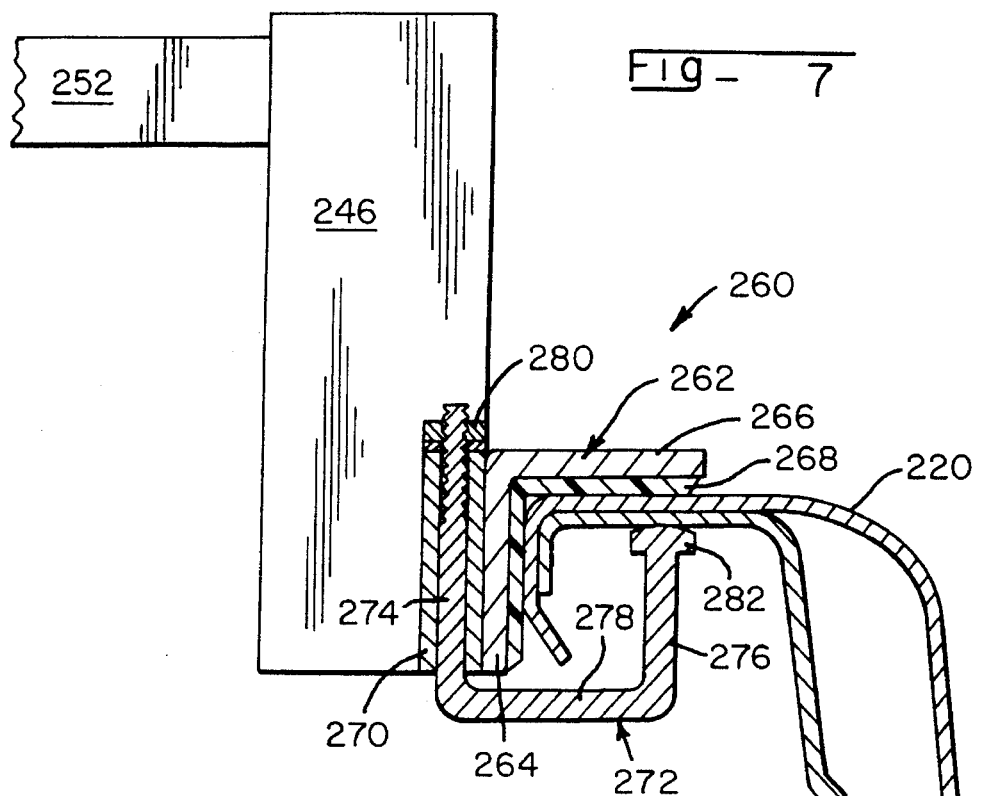
FIG. 7 is a cross-sectional view of a bracket for retaining the carrier portion upon the side wall of a pickup truck.
Figure 8:
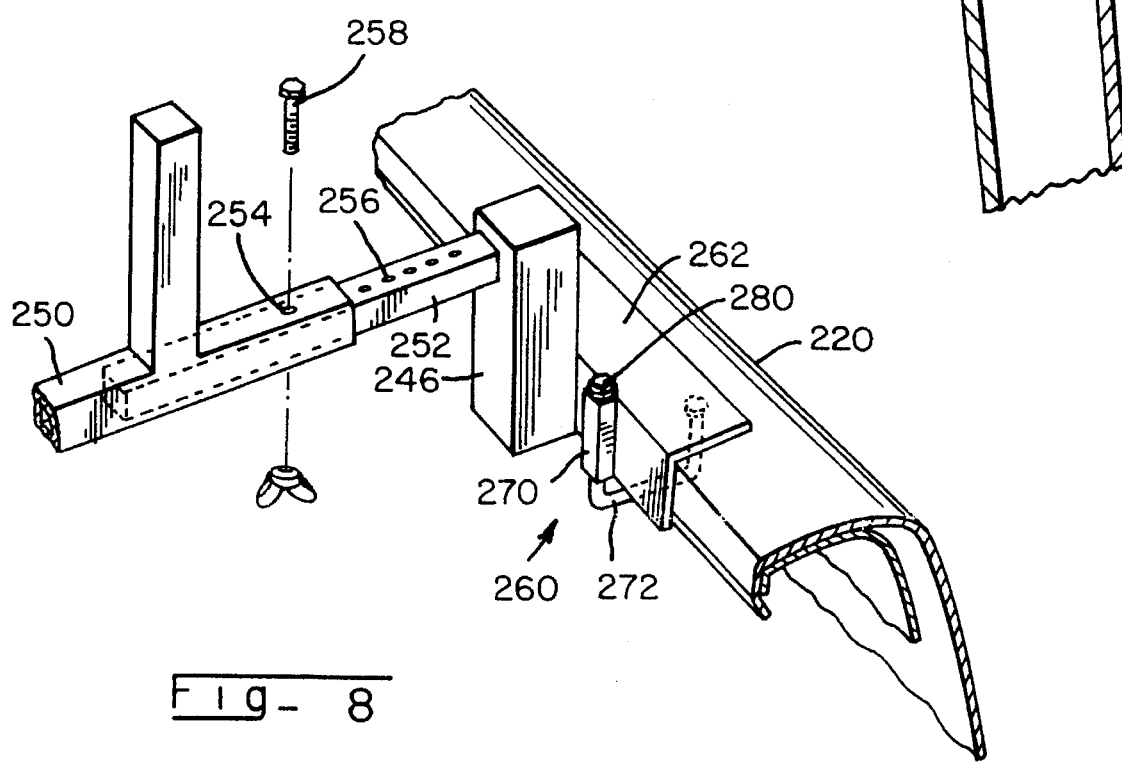
FIG. 8 is a perspective view showing bracket details.

With reference to FIGS. 7–9, a modified form of the invention is illustrated which is capable of essentially universal mounting upon pickup trucks having beds of disparate lengths and widths. As shown, the forward and rearward braces 232 and 234 have been modified for selective telescopic expansion and contraction so as to closely correspond with the width of the pickup truck bed 218. Further, as no portion of the modified braces 232 and 234 need be inserted within the stake pockets 248 provided in the side walls 220 for the support thereof, truck beds of different lengths can be readily accommodated.

It will be noted that each of the braces 232 and 234 include a telescopic horizontal beam, 244 and 245 respectively, supported at a predetermined elevation above the truck side walls 220 by vertical columns 246 joined to each end thereof. The horizontal beams 244 and 245 are each constructed of closely nested tubes 250 and 252 of square cross section so as to prevent relative rotation thereof. Preferably, a central tube 250, having relatively large dimensions, accepts the smaller lateral tubes 252 in each of its opposed, open ends. Proximate each of the opposed ends of the central tube 250, a vertical bore 254 passes through the top and bottom walls of thereof. Similarly, a series of cooperating vertical bores 256 are closely spaced apart along the length of each lateral tube 252. When axially aligned with one another, then, the vertical bores 254 and 256 permit threaded fasteners 258 to join the tubes 250 and 252 together and to selectively fix the length of the horizontal beams 244 and 245.

As should now be apparent, the threaded fasteners 258 may be removed from the bores 254 and 256 as desired to allow the length of the horizontal beams 244 and 245 to be adjusted to correspond to the exact width of the truck bed 218 by the relative telescopic movement of the tubes 250 and 252. In the preferred embodiment, the horizontal beams 244 and 245 may be varied approximately 2 feet (61 cm) in length by the relative telescopic movement of the tubes 250 and 252 thus permitting installation upon truck beds ranging greatly in size. Of course, with the horizontal beams 244 and 245 fully retracted in length, they can be more easily stored away from the pickup truck when not in use.

Each of the vertical columns 246 is secured to the side walls 220 of the pickup truck by a bracket 260 joined to the bottom thereof. Referring now to FIG. 7, a typical bracket 260 may be seen to include a horizontal bar 262 welded to a vertical column 246 in such a manner as to constitute the outermost extension of the end of the brace 245 to which the bar is joined. The bar 262 is provided with an L-shaped cross section and includes a vertical leg 264 in direct contact with the vertical column 246 and a horizontal leg 266 integrally joined to the top of the vertical leg 264 and extending outwardly therefrom. Preferably, the bar 262 is fabricated from a suitable length of angle iron stock sized for distributing the weight of the carrier portion 226 onto the side wall 220 of the pickup truck without causing permanent deformation or damage to the side wall. To further reduce the likelihood of side wall damage, a resilient rubber pad 268 is secured to the bottom of the horizontal leg 266 and the adjacent surface of the vertical leg 264.

Secured to the vertical leg 264 of the bar 262 closely adjacent the column 246 is a U-bolt retaining sleeve 270. As shown, the sleeve 270 comprises a length of square metal tubing dimensioned to closely receive within its longitudinal passage a U-bolt 272. To retain the U-bolt 272 in an orientation for perpendicular engagement with the side wall 220, the retaining sleeve 270 and its longitudinal passage are vertically arranged.

The U-bolt 272 includes a threaded member 274, for positioning within the longitudinal passage of the retaining sleeve 270, and a side wall engaging member 276 joined thereto by an integral coupling member 278. A nut 280 is provided for threaded engagement with the threaded member 274 and, upon tightening, is utilized to clamp the bracket 260 in a fixed position upon the side wall 220. So as to more evenly distribute the clamping force from the U-bolt 272 to the side wall 220, the free end of the side wall engaging member is provided with an enlarged head 282.

With reference to FIG. 9, a prop 284 is seen positioned midway between the forward and rearward braces 244 and 245 for reinforcing the carrier portion 226 when loads having a greater than usual weight are disposed thereon. Preferably, the prop 284 is telescopically adjustable in length so as to permit its installation upon truck beds of varying width. Structurally, the prop 284 is similar to the braces 244 and 245 in that such includes a telescopic horizontal beam 286 supported at a predetermined elevation above the truck side walls 220 by vertical columns 246 joined to each end thereof. Each of the vertical columns 246 is secured to the side walls 220 of the pickup truck by a bracket 260 joined to the bottom thereof. The horizontal beam 286, itself, includes a plurality of nested tubes of square cross section 250 and 252. The central tube 250 accepts the relatively smaller lateral tubes 252 in each of its opposed, open ends. Cooperating bores (not shown) in each end of the tubes 250 and 252 permit the attachment of a threaded fastener 258 in the manner of FIG. 8 for selectively fixing the length of the horizontal beam 286. Preferably, however, each threaded fastener 258 is sized so that its head 288 may be secured to the top of the platform 230 by a washer 290 thereby locking the platform to the prop 284.

Referring back to FIG. 1, collapsible ramps 28 permit an ATV, or other wheeled vehicle, to be rolled onto the carrier portion 26 of the invention. Each ramp 28 includes an elongated upper span 100 and a relatively shorter lower span 102 hingedly connected together by a hinge 104 so that the ramp may be selectively alternated between an extended loading configuration and a collapsed configuration for transport and storage. The upper spans 100 are similar in both overall construction and size to the platforms 30. The upper spans 100 have a length and width substantially equivalent to that of said platforms 30. The lower spans 102, however, while having the same width as the upper spans 100, measure approximately one-half of the upper span's length.

Like platforms 30, spans 100 include a rigid surface sheet 106 of expanded metal mesh welded to the top of a rectangular, supporting frame 108 fabricated from square metal tubing. The expanded metal mesh material, it must be noted, provides the proper texture and smoothness to facilitate the rolling and sliding of objects upon the inclined ramp surface. The frame 108 comprises a pair of laterally positioned side rails 110 joined by relatively shorter transverse rails 112. When the rails 110 and 112 are welded together, the transverse rails 112 define a pair of end rails having an intermediate rail parallel thereto and positioned therebetween. As each of the side rails 110 and transverse rails 112 is positioned beneath the sheet 106, the upper span 100 is provided with a relatively planar, yet reinforced, top.

Lower span 102 is also provided with a rigid surface sheet 114 of expanded metal mesh welded to the top of a supporting frame 116 of square metal tubing. The frame 116, itself, comprises a pair of laterally positioned side rails 118 joined in a rectangular form by a pair of relatively shorter transverse or end rails 120. The frame 116 provides the sheet 114 with a relatively planar and reinforced top.

Figure 4:
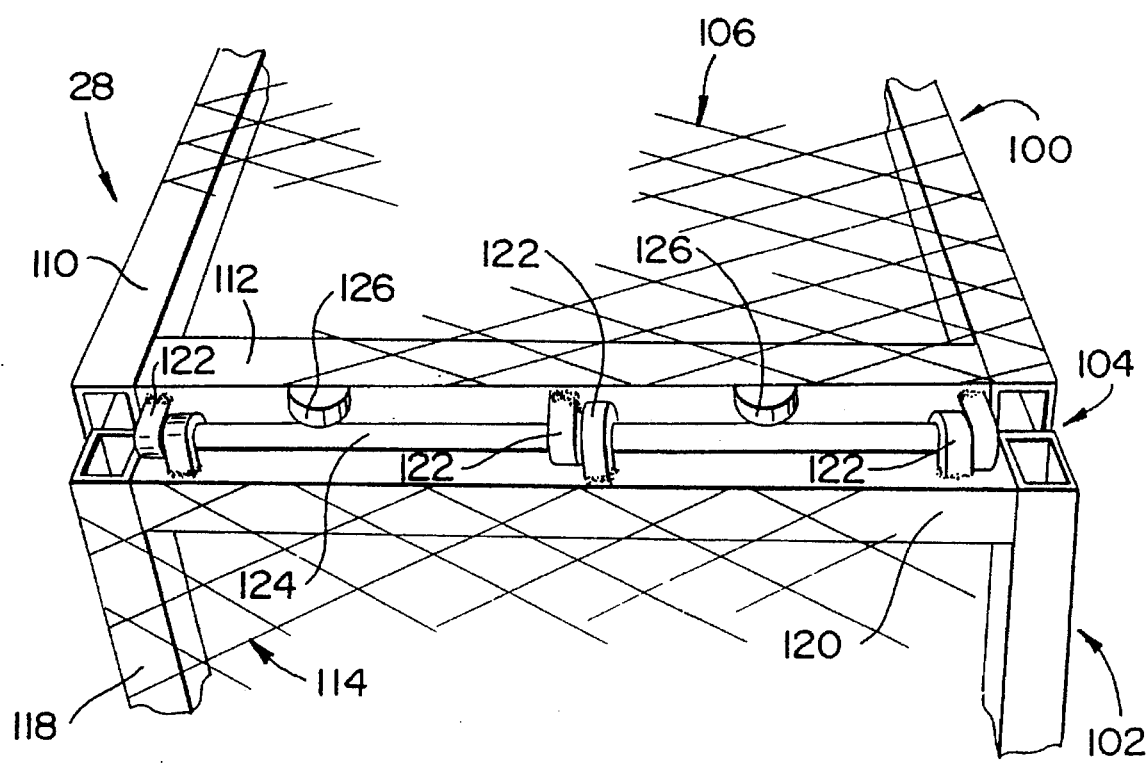
FIG. 4 is a top perspective view of a portion of a ramp illustrating its hinge mechanism.

In FIG. 4 may be seen the hinge 104 which joins the upper span 100 and the lower span 102 together in a single, articulating unit. The hinge 104 comprises a series of paired and juxtaposed collars 122 encircling a transverse connecting rod 124. One collar 122 of each collar pair is welded to the lowermost end rail 112 while the other is welded to the uppermost end rail 120. The collars 122 are provided with central bores (indicated by dashed lines in FIG. 4) so arranged that they may receive the close fitting rod 124 with minimal frictional resistance. Once received by the collars 122, the rod 124 may be retained in place by friction or any other suitable means.

Unrestricted movement of the hinge 104 is checked by stops 126 secured to, and extending outwardly from, the upper surface of the lowermost end rail 112. Each stop 126 comprises a semicircular and inflexible, metallic element sized such that its apex will engage the opposing transverse rail 120 when the ramp 28 is extended fully for loading and unloading purposes. In the preferred configuration, the stops 126 present a projection of such height or distance that the upper and lower spans 100 and 102 are retained at an obtuse angle relative to one another when most fully extended, as illustrated in FIG. 1. Of course, the height of the stops 126 could be reduced to the point where the upper and lower spans 100 and 102 are permitted to meet in a straight line, thus providing a continuous slope from the ground surface to the platforms 30. Either stop arrangement, however, provides stability to the ramps 28 at the hinges 104.

As may be seen in FIGS. 1, 3 and 5, an auxiliary support 130, extending downwardly from the upper span 100 to the ground surface, provides additional stability to each of the ramps 28 during loading and unloading operations. Each support 130 comprises a suitable length of square metal tubing 132 having a broad plate or foot 134 welded to its base for transferring the loads exerted upon its conjoined ramp 28 to the ground surface. The length of each support 130, of course, must be sufficient to extend substantially vertically from its point of attachment to the upper span 100 to the ground. The lateral extent of each foot 134 may be varied somewhat. Nevertheless, it is preferable that the surface area exposed to contact with the ground be sufficient to hold up anticipated loads upon relatively soft soils with minimal soil displacement.

FIG. 5 shows the means for attaching the auxiliary support 130 to the upper span 100. The intermediate rail 112 is provided with a pair of laterally-spaced flanges 136 which have been welded in place so as to provide a rigid structure for the reception of the top portion of the square tubing 132. The flanges 136 extend outwardly and generally downwardly from the intermediate rail 112 beneath the rigid surface sheet 106. The flanges 136 and the top of the tubing 132 are provided with holes, 138 and 140 respectively, so arranged that they may receive a single threaded fastener 142 for pivotally joining the two elements together. Because the auxiliary supports 130 are pivotally joined to the ramps 28, they may be independently positioned during use, allowing the load bearing feet 134 to be placed upon the most stable supporting ground.

The means for attaching the ramps 28 to the carrier portion 26 of the invention are illustrated in FIG. 6. Extending forward from the leading edge of each upper ramp span 100 are a pair of flanges 144. The flanges 144 are welded to the upper surface of each side rail 110 and are provided with a medial bend so that the free ends thereof are substantially horizontally disposed when joined to the carrier portion 26 for loading and unloading operations. The flanges 144 each have a single hole or opening 146 (best seen in FIG. 3) in their free ends. The openings 146 of a given pair of flanges 144 are laterally spaced from one another and appropriately sized so that the bolts 70 joining the platforms 30 to the rearward brace 34 may be extended therethrough in such a fashion so as to lock the ramp flanges 144 between the carrier flanges 60 and 66.

The carrier portion 26 provides a convenient storage area for the ramps 28 when they are not being used for loading operations. Several simple steps must be followed in order to move the ramps 28 from the loading/unloading position of FIG. 1 onto the carrier portion 26, however. First, the fasteners 70 joining the flanges 60, 66, and 144 together must be temporarily removed so that the ramp flanges 144 can be disassociated therefrom. The auxiliary supports 130 are next disconnected from the ramps 28 and stowed upon the truck bed 18. The ramps 28 are then manually lifted into position adjacent the two stays 50 positioned on each side of the truck body 16. As FIG. 2 reveals, the two stays 50 are spaced to support both ends of the upper span 100 of a single ramp 28. Because the two ramps 28 are of similar construction, they may be alternatingly be stored on either of the opposing sides of the carrier portion 26. FIG. 2 also reveals that the hinges 104 joining the ramp spans 100 and 102 together are rearwardly disposed from the stays 50 so that unimpeded movement of the lower spans 102 about the hinges 104 will not be impeded.

Once each ramp 28 has been appropriately positioned, threaded fasteners 53 may be passed through the bores 52 and the openings in the expanded metal mesh to secure the upper spans 100 against the supporting stays 50 in a vertical orientation. The lower ramp spans 102 may next be folded normally with respect to their conjoined upper spans 100 about hinges 104 so that their surfaces contact one another in an overlapping fashion and close the rear of the carrier. The overlap permits a single threaded fastener 150, passing through the center of the expanded metal mesh surfaces 114 of both lower spans 102, to rigidly lock the lower spans together with minimal potential for further movement relative to one another. Although equipment tiedowns (not shown) may be employed as a safety precaution to prevent an ATV being carried by the instant invention from moving about while the pickup truck 12 is in motion, the ramps 28, in their stored configuration as shown in FIG. 2, have sufficient strength to prevent the lateral and longitudinal movement of an ATV from the platforms 30 under normal conditions of usage.

From the foregoing, it will be appreciated that the unique structure of the invention has been defined for increasing the effective load carrying area of a pickup truck bed in conjunction with means for loading wheeled equipment thereon. The invention, being relatively uncomplicated in construction, requires no modification to the truck itself and is mounted and assembled for use by the fastening of a few, hand-tightened bolts. Thus, this invention is one well adapted to attaining all of the ends and objects hereinabove set forth together with other advantages which are inherent to the structure.

It will be understood that certain features and subcombinations are of utility and may be employed without reference to other features and subcombinations. This is contemplated by and is within the scope of the claims. Additionally, it will be appreciated by those skilled in the art that modifications and substitutions may be made to the invention without departing from the scope of the following claims. Thus, it is to be further understood that all matter herein set forth or shown in the accompanying specification and drawings is to be interpreted as illustrative only and not in a limiting sense. Therefore, the present invention is not limited to the various embodiments described herein, but encompasses any and all embodiments within the scope of the following claims.

I claim:

1. A vehicle carrier and ramp assembly for use with a truck having a rectangular bed and laterally spaced side walls provided with an upwardly opening stake pocket proximate each corner of said bed, comprising:

a pair of laterally spaced platforms for supporting a vehicle;

a plurality of braces joined to said spaced platforms for maintaining said spaced platforms at a fixed height above the bed of the truck, each of said braces including a pair of vertical columns, each column adapted for engagement with one of the laterally spaced side walls;

a bracket joined to each of said vertical columns for engagement with the top of one of the laterally spaced side walls, each said bracket including:

a bar having a vertical leg, secured to said vertical column, and a horizontal leg integrally joined to the top of said vertical leg, said horizontal leg being adapted for engagement with the top of one of the laterally spaced side walls; and, a U-bolt secured to said bans for clamping said bracket in a fixed position upon one of the laterally spaced side walls; and a pair of ramps, each of which are detachably connected to a respective one of said spaced platforms for facilitating the moving of a vehicle onto or from said spaced platforms.

2. The vehicle carrier and ramp assembly according to claim 1 wherein, each of said plurality of braces comprises a horizontal beam having one of said pair of vertical columns joined to each end thereof, said horizontal beam including a plurality of nested tubes adapted for selective telescopic adjustment so as to closely correspond with the width of the truck bed.

3. The vehicle carrier and ramp assembly according to claim 1 wherein said columns are of sufficient length to maintain said laterally spaced platforms at an elevated position above the top edges of the truck side walls.

4. The vehicle carrier and ramp assembly according to claim 1 wherein each said ramp comprises a pair of ramp spans hingedly connected together whereby said ramps may be selectively alternated between an extended loading configuration and a collapsed configuration for transport and storage.

5. The vehicle carrier and ramp assembly according to claim 4 wherein said pair of ramp spans includes:

a first ramp span having a length substantially equivalent to the length of one of said laterally spaced platforms; and, a second ramp span having a length less than the combined width of said laterally spaced platforms when positioned side-by-side for use yet greater than one half of the combined width of said laterally spaced platforms when positioned side-by-side for use.

6. The vehicle carrier and ramp assembly according to claim 5 further comprising means for retaining said first and second ramp spans at an obtuse angle relative to one another when most fully extended, said retaining means including a rigid projection secured to the hinged end of said first ramp span for stopping continued hinged movement when said second ramp span is brought into contact therewith.

* * * * *